United States Patent [19]

Schmid

[11] 4,058,039
[45] Nov. 15, 1977

[54] WAFFLE TRANSFER MACHINE

[75] Inventor: Richard R. Schmid, Cincinnati, Ohio

[73] Assignee: Lockwood Manufacturing Company, Cincinnati, Ohio

[21] Appl. No.: 688,129

[22] Filed: May 20, 1976

[51] Int. Cl.² .......................... A21B 5/02; A47J 37/01
[52] U.S. Cl. .......................................... 83/155; 83/205; 83/228; 83/276; 83/569; 83/913; 83/925 R; 99/373
[58] Field of Search ................. 83/155, 165, 205, 222, 83/228, 276, 569, 913, 925 R; 99/373

[56] References Cited

U.S. PATENT DOCUMENTS

| | | | |
|---|---|---|---|
| 2,823,786 | 2/1958 | Grogg, Jr. | 99/373 X |
| 3,780,193 | 12/1973 | De Jersey | 99/373 X |
| 3,857,331 | 12/1974 | Griner | 99/373 |

Primary Examiner—J. M. Meister
Attorney, Agent, or Firm—Wood, Herron & Evans

[57] ABSTRACT

A method and machine adapted to remove baked waffles from a succession of waffle irons on a feed conveyor, trim the waffles so removed into a regular peripheral configuration, and transfer those waffles in succession onto a transfer conveyor. The feed conveyor is adapted to convey a series of successive waffle irons, with baked waffles thereon, from an oven to a transfer location. A vacuum head of novel structure is provided at the transfer location to move cyclically in a machine direction of the feed conveyor between an upstream and a downstream location, the vacuum head being raised and lowered during that limited motion path to pick up waffles by vacuum from successive waffle irons without stopping the conveyor. The vacuum head is also movable in the cross machine direction of the feed conveyor between the feed conveyor and a transfer conveyor. A novel cut off die is located above the transfer conveyor, the vacuum head forcing the baked waffles through the cut off die onto the transfer conveyor as the waffles are discharged from the vacuum head so as to trim the waffles' peripheries into a regular geometrical shape. A centering device on the die cooperates with the vacuum head to insure centering of the waffles over the die itself during waffle discharge onto the transfer conveyor. Further, a locator device is structurally connected with the cut off die to insure that the leading edge of each waffle (relative to the machine direction of the transfer conveyor) does, in fact, make first contact with the transfer conveyor after the waffle passes through the cut off die.

11 Claims, 15 Drawing Figures

WAFFLE TRANSFER MACHINE

This invention relates to bakery product machines and methods. More particularly, this invention relates to a novel waffle transfer machine and method adapted to remove baked waffles from successive waffle irons on a waffle iron conveyor, trim the waffles into a regular geometry, and thereafter discharge those waffles onto a transfer conveyor.

In the manufacture of bakery products such as rolls, bread, and the like, one of the common problems in the baking process is removal of the roll or bread product from the pan within which it is baked. Such a step in the baking process is known as depanning. This depanning step is a necessary manufacturing step because, of course, the roll or bread product is subsequently packaged for sale and the baking pan is subsequently re-used in the baking process. The depanning step for rolls or bread is today often accomplished by depanning equipment or machinery especially designed for a certain type of bread product. A typical depanning machine particularly adapted for use with roll type bakery products is illustrated in U.S. Pat. No. 3,288,088, assigned to the assignee of this application.

Waffles, as is well known to the art, are made in waffle irons comprising an upper half and a lower half with the pancake batter initially disposed therebetween. The removal and transfer of baked waffles from waffle irons in a bakery manufacturing facility presents substantial problems not present in the depanning of rolls, bread and the like. For example, and as is well known, the outer configuration or structure of a waffle is substantially different from a roll or a loaf of bread. A waffle's surface, on each side thereof, is much in the nature of a honeycomb structure comprising a multiplicity of depressions defined by a series of cross ribs. In a commercial bakery manufacturing environment, this honeycomb waffle structure presents a particular problem in lifting of the baked waffles off of successive waffle irons on a waffle iron conveyor because newly baked waffles are relatively fragile and must be handled with care. Further, it is a common occurrence in the baking of waffles to have the pancake batter ooze out or overflow the edges of the irons to the extent that same provides an irregular and undesirable exterior periphery for the baked waffles. Thus, and importantly, the transfer of baked waffles from waffle irons onto a transfer conveyor presents a different problem from the depanning of rolls, bread and the like, because of the unique surface shape and geometry of the waffle itself, and because waffles oftentimes do not have a regular external periphery, i.e., because batter has overflowed the waffle iron to create other than a linear edge on the waffles.

The primary objective of this invention has been to provide a machine and method by which baked waffles may be removed from successive waffle irons on a feed conveyor, transferred from the feed conveyor to a transfer conveyor, and trimmed to provide a waffle of regular geometrical periphery, all without breaking or otherwise injuring the baked waffle.

Another object of this invention has been to provide a novel vacuum head structure adapted to pick up baked waffles from a succession of waffle irons on a feed conveyor without stopping that conveyor, and thereafter discharge the waffles through a novel trimming die which conforms the waffles to a regular rectangular configuration onto a transfer conveyor in a manner that insures the leading edge of each waffle will first contact the transfer conveyor to prevent crumpling of the waffles.

In accord with the objectives of this invention, the waffle transfer machine, in preferred form, includes a waffle iron or feed conveyor disposed substantially parallel to and side-by-side with a transfer or discharge conveyor. A novel vacuum head is carried on head frame structure that permits the vacuum head to reciprocate or cycle horizontally in the machine direction of the feed conveyor so that baked waffles may be vertically lifted up from or picked off the griddles without stopping the conveyor. The vacuum head, after returning to a centering position relative to its machine direction cyclical travel between preset limits, is adapted to move in a cross machine direction from a first position over the feed conveyor to a second position over the transfer or discharge conveyor. A trimming die is positioned vertically above the transfer conveyor, and is interposed between the vacuum head and the transfer conveyor when the vacuum head initially reaches the second position over the transfer conveyor. The vacuum head, being vertically movable downwardly, then forces the waffles carried by the head through the trimming die prior to releasing the waffles onto the transfer conveyor. The trimming die is carried on a float mount so as to insure a centered position with the vacuum head time and again, thereby insuring that the waffles are provided with the desired linear geometrical periphery and the scrap removed therefrom. The trimming die also includes a direction lip which insures that the leading edge of each waffle, relative to the machine direction of the transfer conveyor, falls into contact with the transfer conveyor prior to the trailing edge of the waffle contacting the transfer conveyor, thereby insuring that the waffle is not crumpled as it is passed through the trimming die and discharged onto the transfer conveyor.

Other objectives and advantages of this invention will be more apparent from the following detailed description taken in conjunction with the drawings in which:

FIG. 3 is a partially broken away top view of the waffle transfer machine shown in FIG. 1, taken along line 3—3 of FIG. 1;

GENERAL STRUCTURE AND OPERATION

Figure 1:
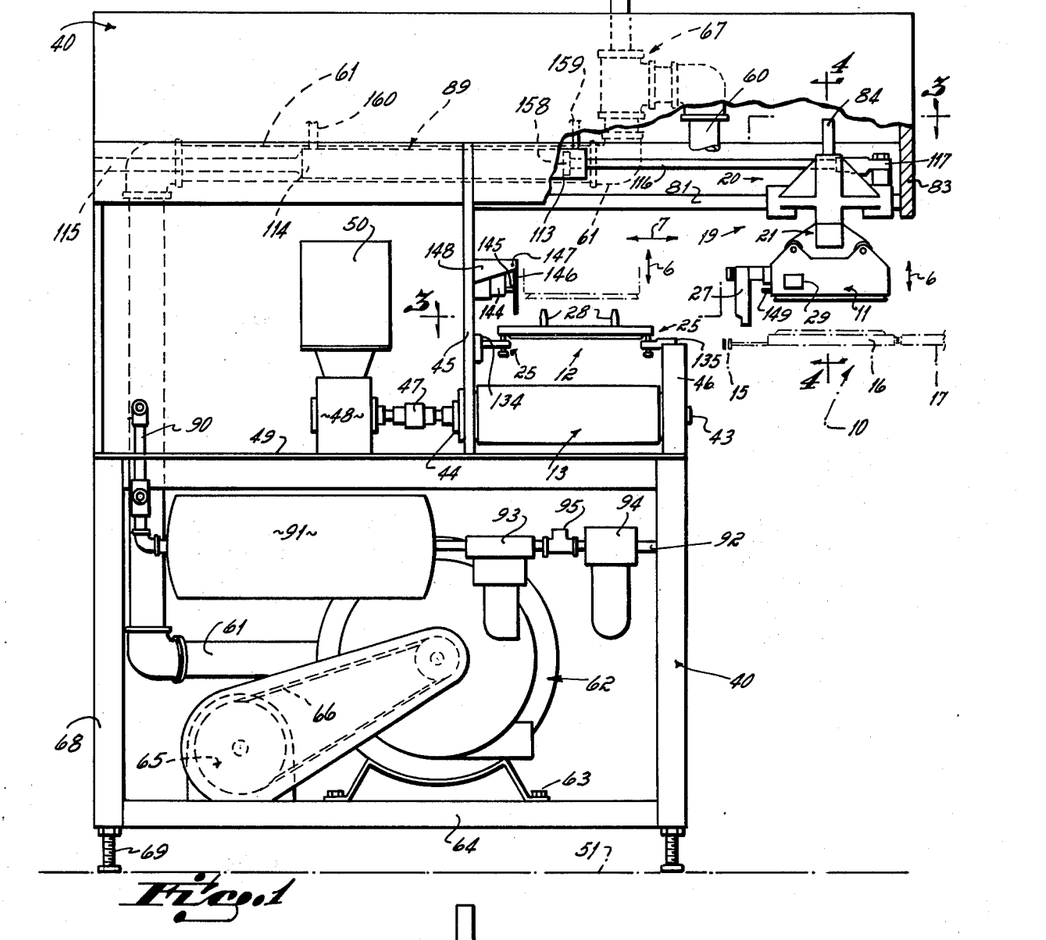
FIG. 1 is an end view of the waffle transfer machine shown in accord with the principles of this invention; the vacuum head being positioned above the waffle iron or feed conveyor.

The novel waffle transfer machine of this invention basically includes, in functional sequence, a waffle iron or feed conveyor 10, a vacuum head 11, a trimming die 12, and a transfer conveyor 13, see FIGS. 1 and 3.

The feed conveyor 10, as illustrated in FIG. 3, is comprised of a series of waffle irons 14 mounted in succession in conveyor like fashion between conveyor side chains 15. Each of the waffle irons 14 includes a base or bottom plate 16 and a lid of top plate 17, the lids being closed as the waffle irons pass through an oven (not shown) for baking the batter, and being opened after the waffles have been baked. The feed conveyor 11 also includes a series of head activator lugs 18 spaced along the endless length of one side chain 15 of the feed conveyor. The transfer conveyor 13 is simply in the nature of an endless slat type conveyor positioned parallel to the feed conveyor 10, the conveying planes of the feed and transfer conveyors being horizontal and approximately coplanar.

The vacuum head 11 includes a carriage structure 19 adapted to guide the vacuum head in its operational cycle above the common conveying plane of the feed 10 and transfer 13 conveyors. The carriage structure 19, which includes an upper carriage 20 and a lower carriage 21, permits the vacuum head 11 to move in a cross machine direction 7 between a first position over the transfer conveyor 13 (shown in phantom lines in FIG. 1) and a second position over the feed conveyor 10 (shown in solid lines in FIG. 2). The carriage structure 19 also permits the vacuum head 11 to move in machine diirections 8, 9 of the conveyors 10, 13, respectively, between a generally centered position (shown in FIGS. 4 and 4A) and an upstream position (shown in FIG. 6), such motion being provided only when the vacuum head is positioned over the feed conveyor 10. The carriage structure 19 further permits the vacuum head 11 to move between limits in a vertical direction when the vacuum head is positioned over the feed conveyor 10 (compare the vacuum head's FIG. 4 position to its FIG. 7 position), as well as when the vacuum head is positioned over the trimming die 12 and transfer conveyor 13 (compare the vacuum head's FIG. 1 phantom line position to its FIG. 11 position). The vacuum head 11 itself is in the nature of two inverted pans 22, 23, each having a ported inner surface especially structured to cooperate with the unique surface configuration possessed by baked waffle groups 24.

The trimming die 12 is located in a relatively fixed and horizontal position above the transfer conveyor 13. The trimming die 12 is provided with a special floating mount 25. The floating mount 25 of the trimming die cooperates with the vacuum head 11 when the vacuum head is positioned over the trimming die so as to exactly center the die relative to the head time after time throughout multiple operational cycles of the waffle transfer machine. The trimming die 12 is provided with two trim ports 129, 130 each sized and configured to configure the outer periphery of each baked waffle group 24 to the size and geometry desired.

Figure 6:
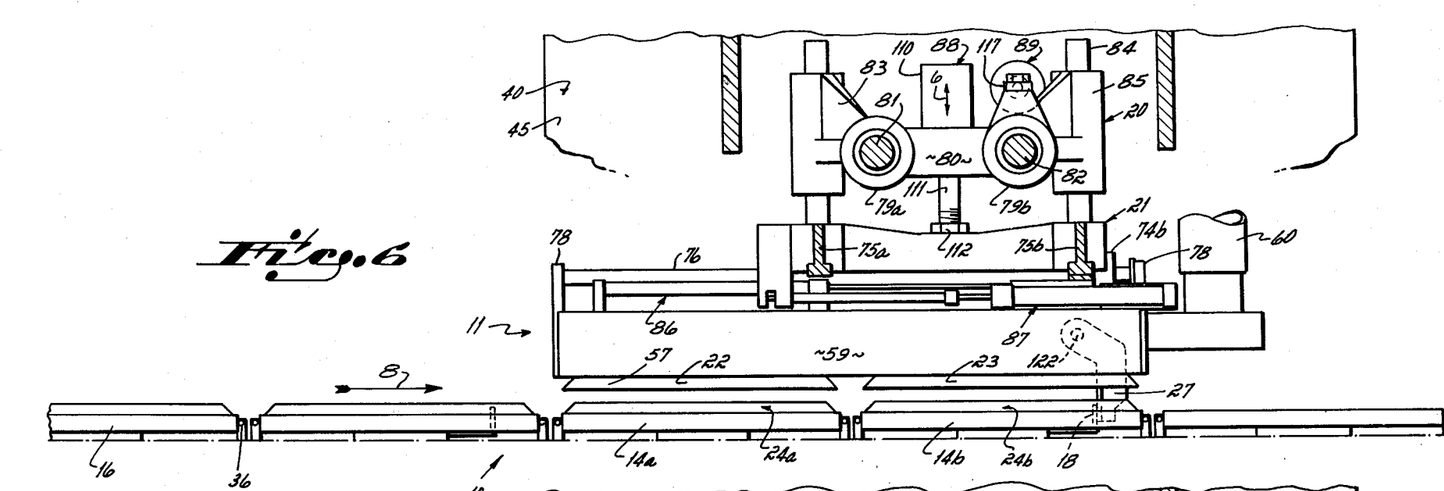
FIG. 6 is a view similar to FIG. 5 showing the vacuum head in an intermediate upstream and intermediate lowered position prior to vacuum engagement with waffles.
Figure 7:
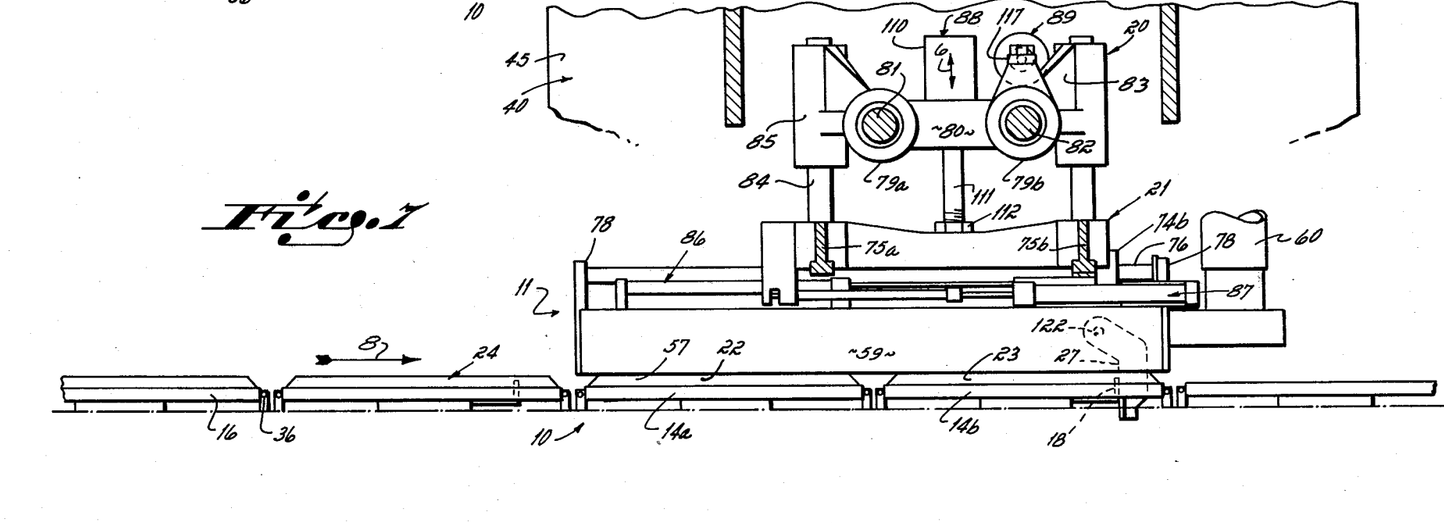
FIG. 7 is a view similar to FIG. 6 showing the vacuum head in a full lowered and intermediate upstream position but with the waffles being vacuum affixed to the vacuum head.
Figure 8:
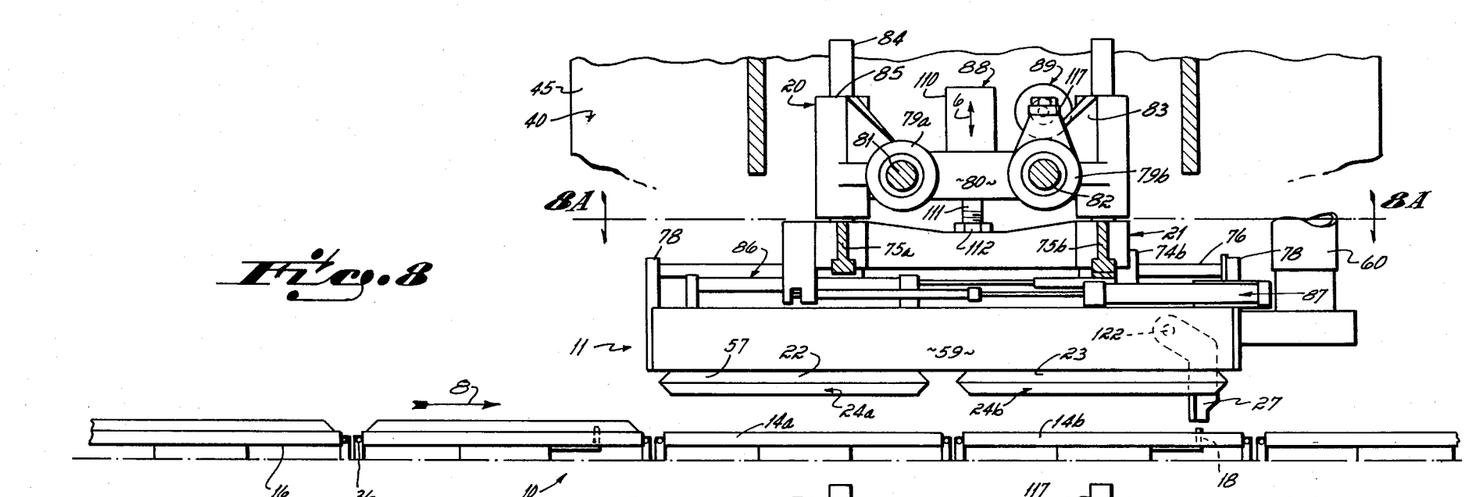
FIG. 8 is a side view similar to FIG. 7 showing the vacuum head in an upraised and intermediate upstream position but with waffles vacuum affixed thereto.

In use, the vacuum head 11 is initially positioned over the transfer conveyor 13 in that attitude shown in FIG. 1 in phantom lines. Upon being activated by controls, not shown, the vacuum head 11 proceeds in a cross machine direction over to a position above the feed conveyor 10, shown in FIG. 3 and 4. Simultaneously, the vacuum head 11 proceeds upstream, relative to the machine direction 8 of the feed conveyor 10, from the center line 26 position shown in FIGS. 3 and 4 (also see FIGS. 4A, 5A and 8A). As the vacuum head 11 moves in the cross machine direction toward its pickup position over feed conveyor 10, and toward the extreme upstream position shown in FIG. 6, the vacuum head's activator arm 27 contacts the feed conveyor's activator lug 18. When such occurs, as shown in FIG. 7, the mechanical interconnection so established overcomes the upstream motion force provided on the vacuum head 11 so that the head is drawn downstream as the feed conveyor 10 carries the lug 18 downstream, thereby retaining the vacuum head itself in exact centered relation over the respective groups 24a, 24b of baked waffles on the waffle irons 14a, 14b. As the vacuum head is carried downstream by the mechanical interconnection, same is lowered until the waffle groups 24a, 24b are picked up on the vacuum head 11 through a vacuum supplied to the head, all as illustrated in FIG. 7. After the waffle groups 24a, 24b have been vacuum attached to the vacuum head 11, and before the vacuum head has been carried back downstream to the generally centered position once again (as indicated by centerline 26), the vacuum head is raised up, thereby also lifting the waffle groups off the waffle irons 14a, 14b, see FIGS. 8 and 9. The vacuum head 11 is then moved in the cross machine direction again until same is repositioned over the transfer conveyor 13, thereby disengaging the conveyor's activator lug 18 from the vacuum head's activator arm 27. This permits the feed conveyor 10 to continue downstream without remaining mechanically interconnected with the vacuum head 11, all as shown in FIG. 9. This portion of the vacuum head's operational cycle includes the machine direction 8, 9 motion portion of that operational cycle.

Figure 2:
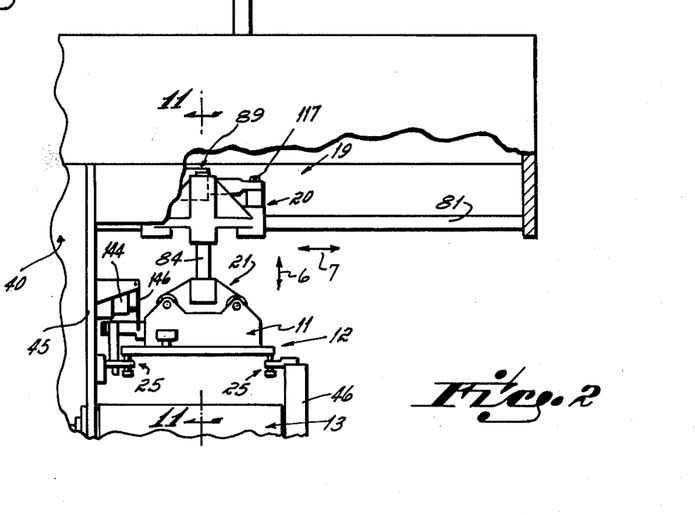
FIG. 2 is an end view similar to FIG. 1 illustrating the vacuum head over the transfer conveyor and above the trimming die.
Figures 11, 11A:
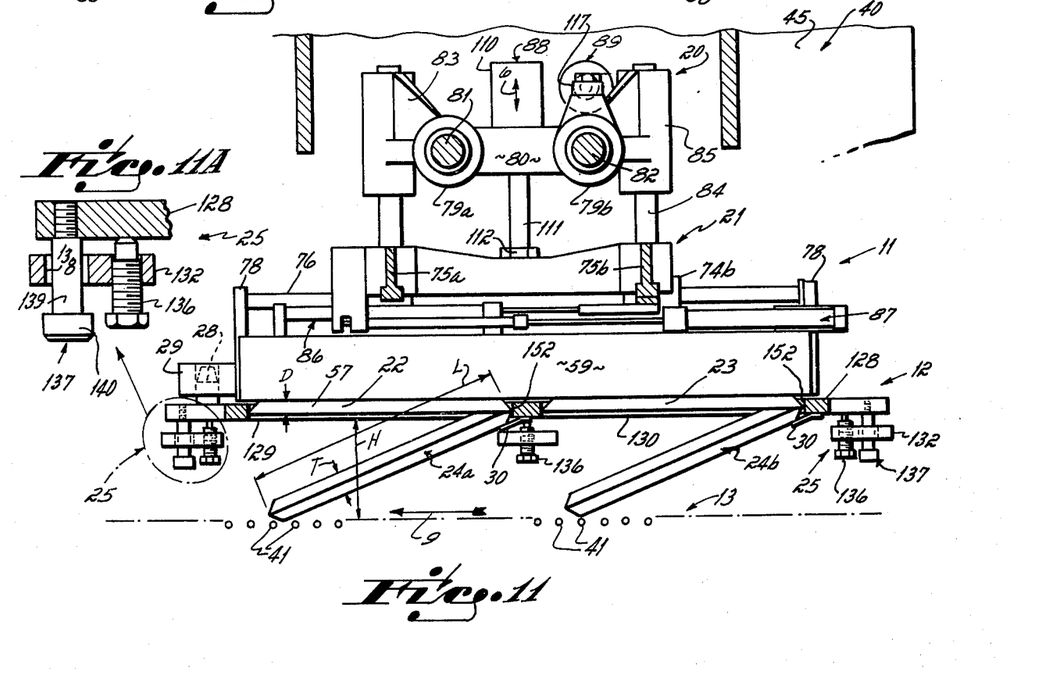
FIG. 11 is a cross-sectional view taken along line 11—11 of FIG. 2 and illustrates discharge of waffles through the trimming die onto the transfer conveyor.
FIG. 11A illustrates in detail the float mounting structure of the trimming die, taken on line 11A—11A of FIG. 3.

As mentioned, once the waffle groups 24a, 24b have been picked up by the vacuum head 11, same are transferred (while in the upraised position) in a cross machine direction 7 from a first position above the feed conveyor 10 as illustrated in FIG. 2 to a second position above the transfer conveyor 13 as illustrated in phantom lines in FIG. 1. After positioning in the FIG. 1 phantom line position, the vacuum head 11 is lowered, thereby forcing the waffle groups 24a, 24b carried thereon through the trimming die 12 as shown in FIG. 11. Centering pins 28 on the trimming die 12 cooperate with centering lugs 29 on the vacuum head 11 to insure exact centering of the vacuum head relative to the trimming die time after time, see FIG. 3. Retarder lips 30 are provided on the downstream end of each die opening 129, 130 in the trimming die, thereby insuring that the upstream end (relative to the machine direction 9 of the transfer conveyor 13) of each waffle group 24a, 24b passing through each opening falls into contact with the transfer conveyor before the downstream end of that waffle group. This insures that the waffle groups 24a, 24b will not be crumpled beneath the trimming die 12 as might occur if the trailing end of each waffle group contacted the transfer conveyor with the leading end of each waffle being stuck therein relative to the machine direction of the transfer conveyor.

After the vacuum head 11 has pushed the waffle groups 24a, 24b through the die 12, same is raised back up to the elevated position preparatory to another pickup cycle. Vertical motion of the vacuum head 11 therefore occurs at two separate points in the vacuum head's operational cycle, namely, when the vacuum head is over the transfer conveyor 13 (to force the waffle groups 24a, 24b through the trimming die), and when the vacuum head is over the feed conveyor 10 (to pick up the waffle groups 24a, 24b from the waffle irons 14a, 14b).

The Feed Conveyor and the Transfer Conveyor

Figure 4:
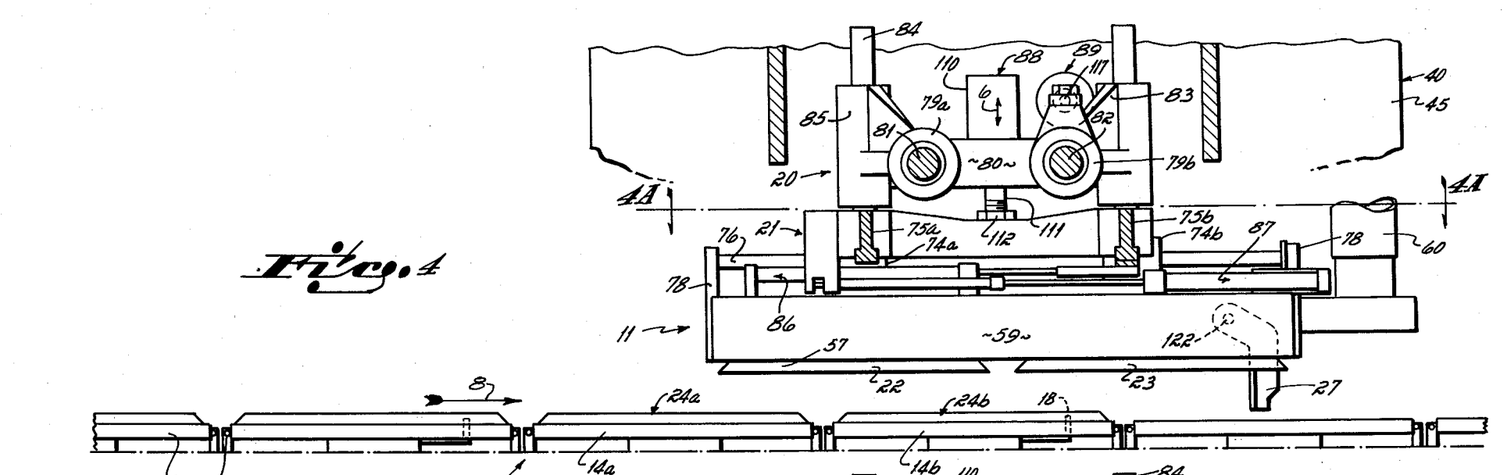
FIG. 4 is a cross-sectional view taken along line 4—4 of FIG. 1 showing the vacuum head in an upraised and centered position without waffles held thereon.

The feed conveyor 10 is best illustrated in FIGS. 3 and 4. As shown in those Figures, same includes a pair of spaced endless side chains 15. A series of waffle irons 14, each iron being configured to provide for baking of six rectangular waffles 35 in an overall square geometrical configuration (group 24), being carried between the spaced endless conveyor chains 15 on plate support frames defined by support rods 36 fixed to those chains. Each waffle iron 14 includes a base plate 16 and a top plate 17, same being pivotally mounted along one side edge of the feed conveyor 10 by pin 37. This hinge pin 37 structure permits the lids to be opened outwardly away from overlapping relation with immediate upstream and immediate downstream waffle irons 14. The waffle irons 14 are held in fixed relation on the plate support frames 36 provided by a latch device 38 on each waffle iron adapted to cooperate with a plate support lug 39 fixed to a side chain 15. The latch devices 38 permit the waffle irons 14 to be removed periodically from the conveyor chain 15 structure for cleaning. The feed conveyor 10 is an endless conveyor powered by motor power means, not shown. The waffle iron conveyor 10, as just described, is well known to the prior art. Generally speaking, such waffle iron conveyors 10 are positioned to run through ovens for baking of the batter put onto the waffle irons prior to passing same into the oven.

The transfer conveyor 13 is particularly illustrated in FIGS. 1 and 3. As shown in those Figures, the transfer conveyor 13 is carried by the support structure 40 for the waffle transfer machine. The transfer conveyor 13 may be of any known type prior art conveyor, an endless slat 41 conveyor being shown for illustrative purposes. The transfer conveyor 13 runs between upstream 42 and downstream 43 shafts, the shafts being carried by bearings 44 in vertical structural members 45, 46 which are part of the support structure 40 for the waffle transfer machine. The conveyor shaft 43 is connected by coupling 47 to gear box 48 mounted on mid-floor 49 of the machine support structure 40. A motor 50 is connected with that gear box 48, thereby providing the drive means for the transfer conveyor. Note that the transfer conveyor 13 and the feed conveyor 10 are disposed parallel one to the other, see FIG. 3. Note also that the conveying surface of the feed conveyor 10 and the conveying plane of the transfer conveyor 13 are generally coplanar, and are horizontal relative to floor 51 level, see FIG. 1. Note further that the machine direction of the feed conveyor 10, as illustrated by directional arrow 8, is counter to the machine direction of the transfer conveyor 13, as illustrated by directional arrow 9, see FIG. 3.

The Vacuum Head Structure

The vacuum head 11 structure is best illustrated in FIGS. 1-4, 4A, 10, 11 and 11A. As shown in those Figures, and as mentioned, the vacuum head 11 includes two inverted pans 22, 23, each pan being provided with ports or holes 54 in a pattern over the flat roof 55 thereof that aligns same over the ridge 56 structure of waffles 35 baked on the waffle irons 14, see particularly FIG. 10. Each pan 22, 23 includes side walls 57 of a depth D equal to about one-half the thickness T of a newly baked waffle group 24, a flange 58 extending outwardly around the periphery of each pan. Each pan's flange 58 seats on the surface of waffle iron 14 when the vacuum head 11 is fully lowered, see FIG. 7, to positively locate the head on the waffle iron during pickup of the respective waffle groups 24 therefrom. Because of the upstream 22 and downstream 23 inverted pans provided on the vacuum head 11, the vacuum head can service or unload two waffle irons 14 on the feed conveyor 10 through each operational cycle.

The inverted pans 22, 23 and a vacuum chamber 59 constitute the vacuum head 11, see FIG. 4. The inverted pans 22, 23 are fixed to the underside of the vacuum chamber 59, the ports 54 in each pan's roof 55 opening into that chamber. The vacuum chamber 59 is connected through flexible hose 60 to a vacuum line 61 carried in an overhead portion of the machine's support structure 40. The vacuum line 61 interconnects with a vacuum pump 62 fixed by bolts 63 to a sub-floor 64 of the machine's support structure 40. The vacuum pump 62 is driven by motor 65 through a drive belt 66. The vacuum line 61, intermediate the vacuum head 11 and the vacuum pump 62, incorporates a vacuum release valve 67 adapted to be activated by controls, not shown, when it is necessary to release the vacuum from the vacuum head 11 during the operational cycle of the waffle transfer machine. The sub-floor 64 and the mid-floor 49 of the machine are fixed to legs 68 supported on adjustable feet 69 above floor 51 level, same cooperating to provide the machine's support structure 40.

As previously noted, the vacuum head 11 is mounted for machine direction 8, 9 movement relative to the feed 10 and transfer 13 conveyors, as well as for cross machine direction 7 movement relative to those conveyors, as well as for vertical direction 6 movement relative to the conveying plane of the conveyors 10, 13. Also as previously noted, the carriage structure permitting that movement, and to which the vacuum head 11 is attached, includes upper 20 and lower 21 carriage frames. The lower carriage frame 21, which guides the vacuum head in its machine direction 8, 9 movement, is comprised of pairs of guideways 74a, 74b, each guideway of each pair being interconnected by webs 75a, 75b, respectively, see FIG. 4A. The pairs of guideways 74a, 74b are held in fixed and aligned relation one with the other by center web 73. One of each pair of guideways 74a, 74b is slidably received on a common slide rod 76 or 77, the slide rods being parallel one to the other, being spaced above the vacuum chamber 59, and being fixed to and between flange members 78 fixed in position to the leading and trailing ends of the vacuum chamber. The slide rods 76, 77 are disposed longitudinally of or parallel to the machine direction 8, 9 of the conveyors 10, 13, thereby cooperating with guideways 74 to guide the vacuum head 11 in its machine direction movement.

The upper carriage frame 20, which guides the vacuum head 11 in its cross machine direction movement, is comprised of spaced pairs of parallel guideways 79a, 79b, see FIGS. 3 and 4 of each pair of guideways 79a, 79b is fixed together by webs 80, thereby orienting the guideways to define motion axes extending in a horizontal plane in the transverse or cross machine direction relative to the conveyors. The pairs of transverse motion guideways 79a, 79b cooperate with slide rods 81, 82, respectively, that are fixed in position relative to the machine's support structure 40. At one end, each slide rod 81, 82 is fixed to head member 83 of the machine's support structure, and at the other end each slide rod is fixed to structural member 45 of the machine's support structure, see FIG. 1. The cross machine direction slide rods 81, 82 are the only side rods in the carriage structure 19 that are fixed in position relative to floor level 51.

The upper carriage frame 20 also guides the vacuum head 11 in its vertical direction 6 movement. Each web 80 of the upper frame 20, intermediate the guideways of each horizontally aligned pair 79a and 79b, also carries a vertically oriented guideway 85, see FIGS. 1, 3 and 4.

The two spaced and vertical guideways 85 are adapted to cooperate with vertically oriented and parallel slide rods 84, the slide rods being positioned outside and on opposite sides of the slide rods 81, 82, see FIG. 4. The bottom end of each slide rod 84 is fixed to a web 75 of the lower carriage frame structure 21, the top end of each slide rod 84 being free to reciprocate within the guideways 85.

The vacuum head 11 is provided with pneumatic power means for moving same in the horizontal machine direction 8, 9, for moving same in the vertical direction 6, and for moving same in the horizontal cross machine direction 7, all such power means being in the form of pneumatic cylinders 86-89. The pneumatic cylinders 86-89 are all interconnected to an air pressure line 90 mounted to the transfer machine's support structure 04, see FIG. 1. The air pressure line 90 incorporates a surge tank 91 fixed to the underside of the mid-floor 49, the inlet line 92 to the air surge tank including the appropriate air filter 93, 94 and pressure regulator 95 devices well known to the art. The air inlet line 92 is connected to a shop air source, not shown.

Figure 4A:
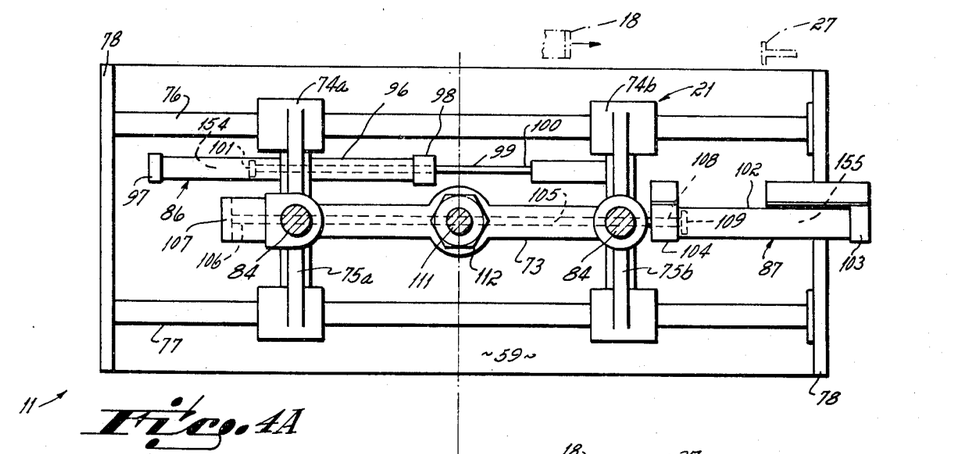
FIG. 4A is a top view of the vacuum head in that same operational position as shown in FIG. 4, and taken along line 4A—4A of FIG. 4.

The pneumatic power means for moving the vacuum head 11 in the horizontal machine direction 8, 9 is particularly illustrated in FIGS. 4 and 4A. That pneumatic power means includes upstream motion cylinder 86 and centering cylinder 87. The upstream motion cylinder 86 has its cylinder 96 fixed at both ends (as at 97, 98) to the vacuum head 11 itself, i.e., the vacuum chamber 59, see FIG. 4A particularly. The upstream motion cylinder's rod 99 is fixed at one end 100 to the lower carriage's downstream web 75b, the other end of the cylinder rod presenting head 101 within the cylinder 96. The centering cylinder 87 includes a cylinder 102 also fixed at both ends (as at 103, 104) to the vacuum head 11. The centering cylinder's rod 105 is fixed at one end 106 to bracket 107 attached to the lower carriage's upstream web 75a and is fixed at the other end 108 to head 109 within the cylinder 102. Note particularly that the upstream motion cylinder 86 and the centering cylinder 87 are oriented parallel to the machine direction 8, 9 of the feed 10 and transfer 13 conveyors. Note also that, relative to the machine direction 8 of the feed conveyor 10, the rod 99 end of the upstream motion cylinder 86 extends downstream of that cylinder, and that the rod 105 end of the centering cylinder 87 extends upstream of that cylinder, i.e., that the cylinders are oriented so that the respective rods 99, 105 extend outwardly therefrom in opposite directions relative one to the other. Each of the upstream motion cylinder 86 and the centering cylinder 87 is connected by respective flexible hoses (not shown) to the air pressure line 90.

The pneumatic power means for reciprocating the vacuum head 11 in its vertical direction 6 movement includes pneumatic cylinder 88, see FIGS. 3, 4, and 4A. The vertical motion cylinder 88 includes cylinder 110 fixed to center web 80 of the upper carriage structure 20, that web being connected to guideways 79a, 79b. A cylinder rod 111 is connected as at 112 with center web 73 of the lower carriage 21, thereby connecting the upper 20 and lower 21 carriages through the vertical motion cylinder, see FIG. 4. Thus, the vertical motion cylinder 88 raises and lowers the vacuum head 11, and the lower carriage 21 structure which carries the head and the pneumatic cylinders 86, 87 for moving the head in the machine direction 8, 9, during the operational cycle of the waffle transfer machine. A hose (not shown) connects the air pressure line 90 with the vertical direction motion cylinder 88.

The pneumatic power maans which translates the vacuum head 11 between a first position over the feed conveyor 10 and a second position over the transfer conveyor 13 is illustrated particularly in FIGS. 1 and 3. As shown in those Figures, the cross machine direction motion cylinder 89 includes casing 113 fixed as at 114 to structural member 115 of the machine's support structure 40, and intermediate its ends to structural member 45. The cylinder 116 rod extending from the cylinder 113 is fixed as at 117 to a guideway 79b of the upper carriage 20 structure. The upper carriage 20, it will be recalled, does not move in a vertical motion path. A hose 160 connects the air pressure line 90 with the cross machine direction motion cylinder 89.

The vacuum head 11 also carries a head activator arm 27 pivotally connected thereto at its downstream end. The pivot axis 121 of the head activator arm 27, as shown in FIGS. 3 and 4, is transverse relative to the machine direction 8 of the feed conveyor 10. The activator arm 27 is carried on a shaft 122 in spring 123 loaded fashion. The spring 123 loads the activator arm for a clockwise rotation, as illustrated in FIG. 4. Cam latch 124 stops the activator arm 27 in a high tension clockwise rotational position, that cam latch structure connecting the activator arm to the vacuum chamber 59. However, the cam latch 124 is structured to permit counterclockwise rotation, as illustrated in FIG. 4, of the activator arm 27 when the spring 123 tension load is exceeded. Such would be necessary if, for example, the vacuum head 11 was rendered inoperative over the feed conveyor 10 but the feed conveyor remained operating. Without the spring loaded activator arm 27, the head 11 or conveyor 10 structure could be severely harmed under such malfunction circumstances.

A series of activator lugs 18 are fixed to the feed conveyor 10 on plate supports 39 to cooperate with the activator arm 27 on the vacuum head 11. The lugs 18 are in the form of finger-like projections which extend upwardly from the feed conveyor 10 at spaced locations along the length of the endless length conveyor, the lugs being positioned in the same vertical plane as the activator arm 27. Successive lugs 18 are spaced one from the other a distance equivalent to the length of two adjacent waffle irons 14 on the conveyor for the reason that the vacuum head 11 is sized to service two such waffle irons at a time during each operational cycle of the head. The tension strength of the spring 123 which holds the activator arm 27 in latched relation must be such that, when the arm 27 is engaged by an activator lug 18 on the feed conveyor 10, same will remain mechanically engaged (as illustrated in FIG. 6) to draw the vacuum head 11 downstream from an extreme upstream position illustrated in FIG. 6 to the centered position illustrated in FIG. 4, all as described in detail below in connection with the operation of the waffle transfer machine.

The Trimming Die Structure

The trimming die 12 is particularly illustrated in FIGS. 1, 3, 11 and 11A. As shown in those Figures, the trimming die 12 is elevated at a horizontal position above the transfer conveyor 13, but below the upper position of the vacuum head 11. The trimming die 12 basically includes a die frame 128 having an upstream square opening 129 and a downstream square opening 130, each opening being sized and configured to permit the respective inverted pans 22, 23 to pass therethrough in a trim fit relationship. The die frame 128 is mounted on a float mount 25 type supporting structure fixed to the machine's support structure 40. The basic support elements for the die frame 128 include ears 132, 133 fixed to spaced and parallel structural members 134, 135, respectively. Structural member 134 is fixed to structural member 45 of the machine's support structure 40, and structural member 135 is fixed to structural member 46 of the machine's support structure, see FIG. 1.

The die frame 128 itself is carried in float mounts 25 provided at each of the four corners thereof (a blown up view of a typical float mount being illustrated in FIG. 11A), and supplemented at the middle thereof adjustable bolts 136. As shown in FIG. 11A, each float mount 25 includes a machine bolt 137 threadedly engaged with the underside of the die frame 128, the machine bolt passing through a hole 138 in corner support ear 132 or 133 that is of substantial larger diameter than the diameter of the machine bolt's shaft 139. The machine bolt's head 140 is of sufficient size to prevent disengagement of the die frame 128 with the corner support ear 132 or 133, i.e., to prevent the die frame from being lifted upwardly out of engagement with its ear 132, 133 support structure. The diameter relationship of the large diameter holes 138 in the four corner ear supports 132, 133 to the small diameter of the machine bolt shafts 139 permits the die frame 128 to float or move in a limited horizontal fashion above the transfer conveyor 13.

The die frame 128 also carries a centering pin 28 at each of two opposed corners on the top surface of the die frame, see particularly FIG. 3. The centering pin 28 are sized to fit in a sliding guide relation within holes 142 in centering lugs 29 fixed to analogous corners on the vacuum head 11 itself, see FIG. 11. The centering pin 28 are tapered, also as illustrated in FIG. 11, to a diameter at the free or top end thereof which is substantially less than the diameter of the holes 142 in the centering lugs 29, thereby insuring that the centering lugs will pass over the centering pins and operatively engage therewith when the vacuum head 11 is initially positioned over the die frame 128 during the operational cycle of the waffle transfer machine.

The die frame 128 rests on its underside, and as shown in FIG. 11A, on a series of four corner machine bolts 136 which bear against the underside of the die and which are threadedly engaged with the four corner support ears 132, 133 of the trimming die 12. The point support bolts 136 serve to provide a nominal bearing surface over which the die frame 128 may slide as same is centered by means of interengagement between the trimming guide's centering pins 28 and the vacuum head's centering lugs 29, thereby reducing to a minimum level the frictional resistance of the die frame to sliding over the support ears 132, 133 which are necessary to maintain the die frame in its suspended location above the transfer conveyor. Note that, by using machine bolts 136, the point suspension for the die frame 128 so provided can be adjusted at the corners to level the die frame when and as required if same gets out of its preferred horizontal position. Note also that point support bolts 136 are provided in ears 132, 133 midway along each side of the die frame 128 to further support the frame in its horizontal position, see FIG. 3.

A safety device in the form of a go/no go switch 144 is provided to shut down the waffle transfer machine in case of major alignment problems between the die frame 12 and vacuum head 11 when the vacuum head approaches the phantom line position from the solid line position as shown in FIG. 1. The centering pins 28 on the die frame 128 and the centering lugs 29 on the vacuum head 11 cooperate to insure centering of the vacuum head over the die frame so as to eliminate minor alignment problems. The go/no go switch 144 is illustrated in FIG. 1 and includes a button switch 145 adapted to be activated by a slotted plate 146. The slotted plate 146 is pivotally mounted on axis 147 to a bracket 148 fixed to the machine's support structure 40. A locater pin 149 is fixed to the vacuum head 11 on the transfer conveyor 13 side of the vacuum head, the locater pin being of a smaller diameter than the width of slot (not shown) in the plate 146. If, in use of the device, the locater pin 149 contacts the slotted plate 146 as the vacuum head 11 travels from the solid line to the phantom line position shown in FIG. 1, then the switch 145 itself is activated which, in turn, activates controls not shown, that shuts down the machine. As mentioned, same indicates major alignment problems between the vacuum head 11 and the trimming die 12. If, on the other hand, and upon traverse of the vacuum head 11 from its second position over the feed conveyor 10 to its first position over the transfer conveyor 13, the vacuum head 11 is sufficiently centered so that the locater pin 149 head passes through the slot (not shown) in theplate 146 unhindered, then the safety device is not activated and the operational cycle of the waffle transfer machine continues uninterrupted.

A retarder lip 30, as is particularly shown in FIG. 11, is fixed to the underside of the die frame 128 at the upstream edge 152 of each opening 129, 130 in the die frame relative to the machine direction 9 of the transfer conveyor 13, see FIGS. 3 and 11. Each retarder lip 30 is angulated downwardly between the underside of the die frame 128 and the transfer conveyor 13, and is sized to extend inwardly a slight distance into its respective hole of the die frame when the trimming die is viewed in top view as shown in FIG. 3, thereby insuring that contact of waffle groups 24 pressed through the die frame will engage the retarder lips as same pass through the die frame. The die frame 128 itself, as shown in FIG. 11, is positioned at a height H above the transfer conveyor that is less than the machine direction length L of each waffle group 24, that spatial orientation cooperating with the retarder lips 30 to effect transfer of the waffle groups 24 onto the transfer conveyor as described in detail below.

Detailed Operation of the Machine

The waffle transfer machine of this invention is operative to remove baked waffles 35 in groups 24 of six from previously opened waffle irons 14, trim the peripheral edge 153 of each group of waffles so that all groups are provided with the same dimensions and peripheral geometry, and deposit those waffles onto a transfer conveyor 13. In practical use, the waffle transfer machine will be operatively related with the waffle iron conveyor 10 immediately downstream from the oven, not shown, in which the waffles are baked, the feed conveyor being the same conveyor as is used to convey the waffle irons through the oven. The transfer conveyor 13 transfers the groups 24 of waffles to a packaging station or, alternatively, to a storage station such as a freezer.

As illustrated in FIG. 3, the waffle irons 14 have had lids 17 opened so as to expose the baked waffles thereon prior to moving into operative relation with the waffle transfer machine of this invention. Each waffle iron 14 as shown is adapted to cook a group of six waffles, each group possibly including excess baked or charred batter (not shown) which might extend partially or completely around the peripheries of the group. With the vacuum head 11 in centered position over the waffle iron or feed conveyor 10, as illustrated in FIG. 4 and 4A, description of the waffle transfer machine's operational cycle will begin.

Figure 5:
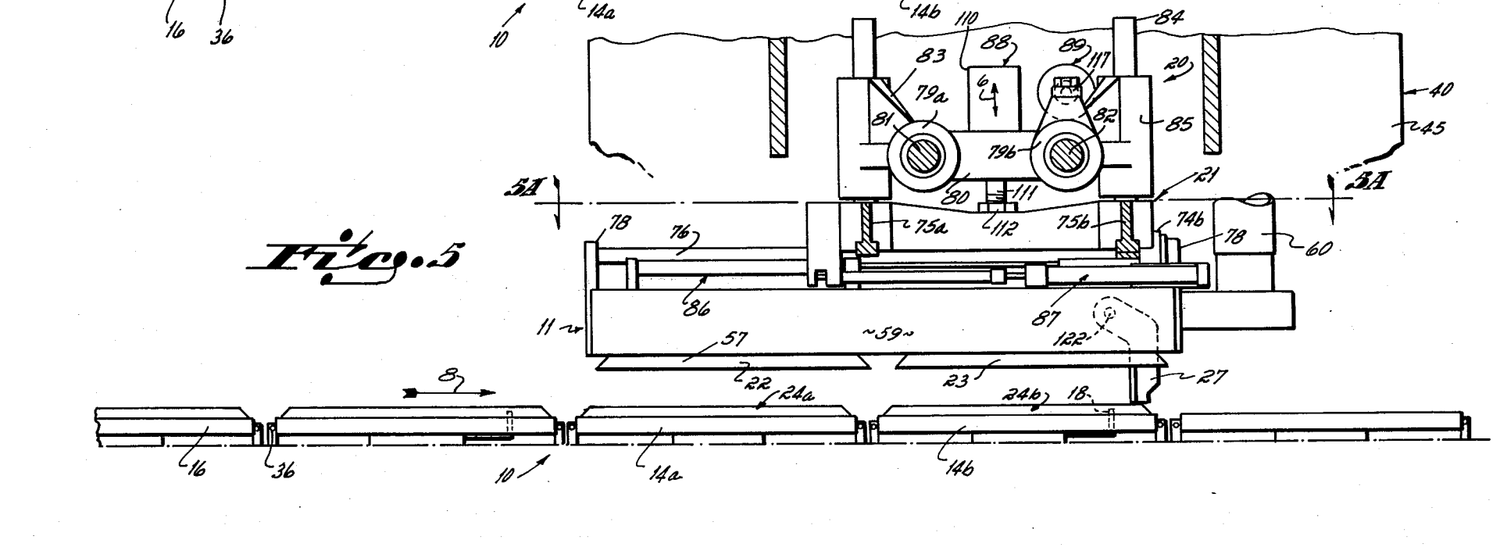
FIG. 5 is a view similar to FIG. 4 showing the vacuum head in an upraised and upstream position.
Figure 5A:
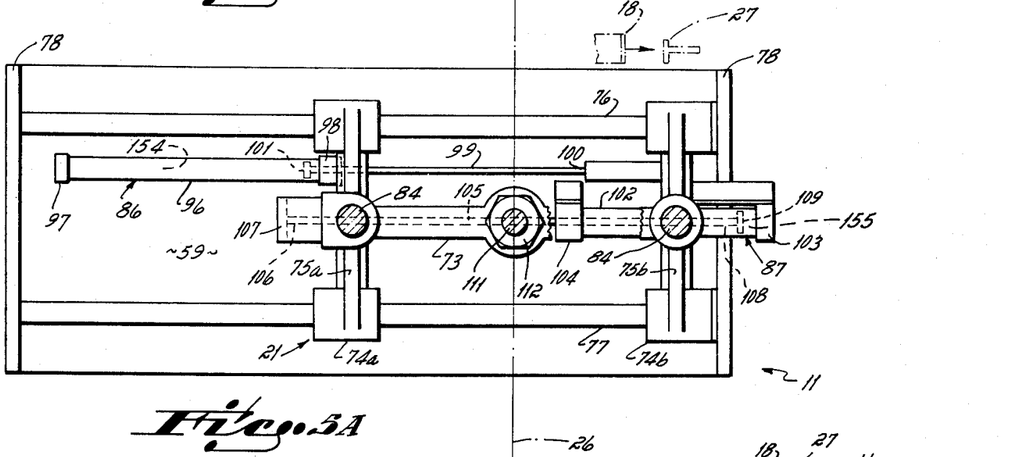
FIG. 5A is a top view of the vacuum head in that same operational position shown in FIG. 5, and taken along line 5A—5A of FIG. 5.
Figure 8A:
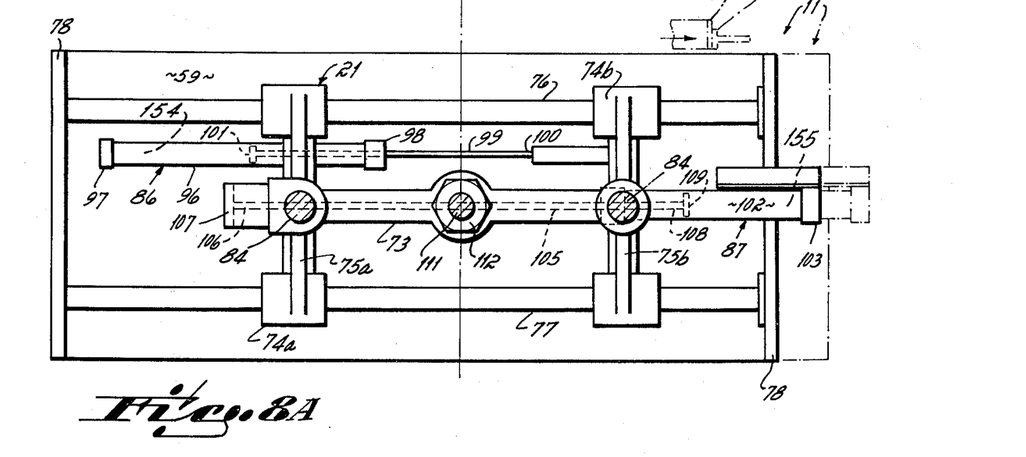
FIG. 8A is a top view of the vacuum head in that same operational position shown in FIG. 8, and taken along line 8A—8A of FIG. 8.
Figure 9:
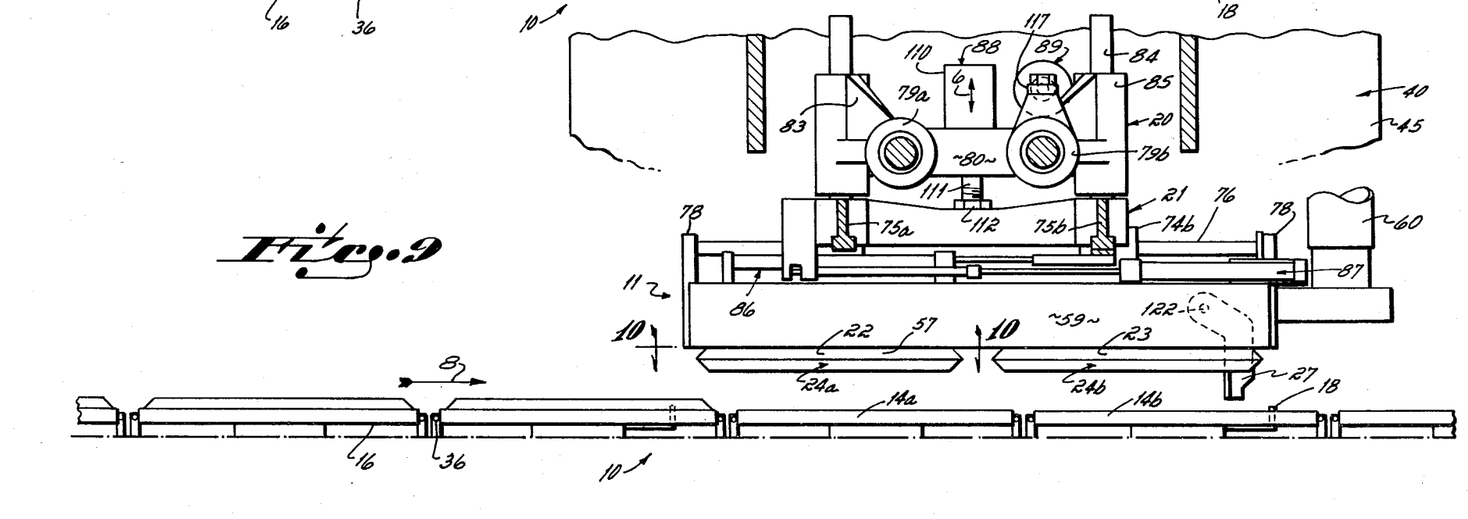
FIG. 9 is a side view similar to FIG. 8 showing the vacuum head in upraised and centered position relative to the head frame structure prior to transfer from the FIG. 1 position over the feed conveyor to the FIG. 2 position over the transfer conveyor.
Figure 10:
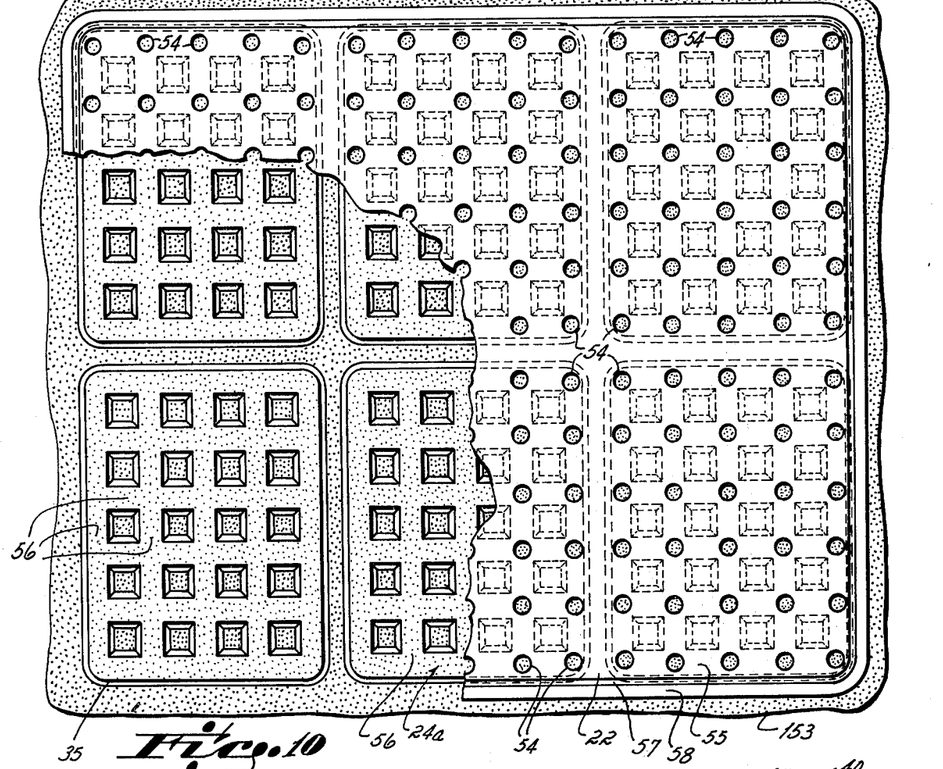
FIG. 10 is a partially broken away top view of the vacuum head itself with waffles attached as taken along line 10—10 of FIG. 9.

High pressure air from line 90 is maintained in side 154 of cylinder 86 and side 155 of cylinder 87 so that the vacuum head 11 is in the relatively centered position relative to the feed conveyor 10 as well as the transfer conveyor 13 (and as indicated by centerline 26 in FIGS. 4A, 5A and 8A). To drive the head 11 from over the transfer conveyor 13 to over the feed conveyor 10, i.e., from the phantom line to the solid line position shown in FIG. 1, high pressure air is introduced into side 160 of cylinder 89 and side 159 is vented by controls, not shown. Simultaneously, and to drive the head 11 to the left, from the position shown in FIGS. 4 and 4A, to the position illustrated in FIGS. 5 and 5A, high pressure air is removed from cylinder 87, thereby permitting the cylinder 86 to drive the vacuum head 11 upstream relative to the lower carriage's guideways 74a, 74b and relative to the machine direction 8 of the feed conveyor. As the vacuum head 11 proceeds to the upstream position shown in FIGS. 5 and 5A, the activator arm 27 carried by the vacuum head 11 interengages an activator lug 18 carried by the feed conveyor 10, this interengagement occurring before the head is lowered. At this interengagement, the machanical force of the feed conveyor 10 overcomes the pneumatic high pressure force in the upstream motion cylinder 86, thereby causing the vacuum head to be drawn downstream, i.e., in the machine direction 8, of the feed conveyor. Once in the upstream position, as illustrated in FIGS. 5 and 5A and as limited by contact of cylinder's piston 101 with cylinder's end 98, the vacuum head 11 is lowered from the upraised position shown in FIG. 5 to the lowered position shown in FIG. 6, same being lowered by high pressure air introduced from air line 90 into the upper end of vertical motion cylinder 88 by controls (not shown). The vacuum head 11 continues to lower from an intermedicate position illustrated in FIG. 6 to a fully lowered or bottomed-out position, illustrated in FIG. 7, where the bottom edge 58 of the inverted pairs of pans 22, 23 is just slightly above the irons 14, as the vacuum head continues to be drawn downstream. Of course, the pans 22, 23 are centered relative to the irons 14 automatically through engagement of activator arm 27 with activator lug 18. At the bottomed-out position illustrated in FIG. 7, vacuum is introduced into the vacuum chamber 59 in response to controls (not shown). Because of the unique ported structure of the vacuum head's inverted pans 22, 23 vis-a-vis the surface geometry of the waffles 35, same are picked up in vacuum engagement with the vacuum head, i.e., drawn out of contact with the waffle iron bases 16. During such vacuum engagement of the vacuum head 11 with the waffle groups 24, the vacuum head is continually drawn downstream by mechanical engagement of the feed conveyor's activator lug 18 with the vacuum head's activator arm 27 since the conveyor 10 moves continuously.

After vacuum engagement of the waffles 35 with the vacuum head 11 has been achieved, and again while the vacuum head is continually being drawn downstream in the machine direction 8 of the feed conveyor 10, the high pressure side of the vertical motion cylinder is switched from its upper side to its lower inlet by controls (not shown) so that the vacuum head is raised up once again. This subsequent upraising of the vacuum head 11, with waffles 35 vacuum attached, occurs until the vaccum head once again achieves the fully upraised position illustrated in FIG. 8. As the head 11 is being raised to the FIG. 8 attitude, same is simultaneously cycled in a transverse direction 7 from its second position over the feed conveyor 10 to its first position over the transfer conveyor 13 (compare the solid line position of the vacuum head shown in FIG. 1 to the phantom line position of the vacuum head in that same figure. The upper carriage 20 (and, hence, the vacuum head and lower carriage 21) is slidably moved along slide rods 81, 82 as high pressure air from air line 90 is introduced into inlet 159 of cross machine direction motion cylinder 89 through activation of controls (not shown). Further, as the head 11 is being raised to the FIG. 8 attitude, and as the vacuum head 11 is being moved transversely from over the feed conveyor 10 to back over the transfer conveyor 13, the centering cylinder is simultaneously activated by controls (not shown) with high pressure air being introduced into side 155 so as to move the vacuum head back to the centered position from its intermediate upstream position. At the centered position, cylinder head 109 abuts end 108 of the centering cylinder 87, thereby locating the vacuum head 11 in the centered position. This centering is accomplished because the cylinder 87 is larger than cylinder 86.

If, however, and because of a malfunction of the waffle transfer machine, the vacuum head 11 should remain positioned so that the vacuum head's activator arm 27 and feed conveyor's activator lug 18 remain mechanically interengaged as illustrated in FIG. 7, and if the vacuum head 11 should be drawn downstream past the centered position 26 whereat same is stopped because of interengagement of the centering cylinder's head 109 with one end 108 thereof, then the vacuum head's activator arm will be pivoted or cammed upwardly over the feed conveyor's activator lug against the bias of tension spring 123 as the feed conveyor 10 continues to move in the machine direction 8. Of course, under normal operation the tension of tension spring 123 is sufficient to prevent such a camming function of the activator arm. At this maximum downstream position under such abnormal circumstances, the vacuum head 11 trips a switch (not shown) which in turn shuts off power to the waffle transfer machine, thereby terminating operation of the machine itself. Provision of this safety feature, in light of such a potential malfunction, would prevent structural damage to the feed conveyor 10 and/or to the waffle head 11 simple by permitting the activator arm 27 to be cammed upwardly over the transfer conveyor's activator lug 18 if the feed conveyor 10 continued to run.

General location of the vacuum head 11 over the trimming die 12 is achieved by bottoming-out of the cross machine direction cylinder's head 158 against the one end 113 of that cylinder. If the locater pin 149 attached to the vacuum head 11 has passed through the slot in the switch activator plate 146, i.e., if the safety switch 144 has not been activated, then the upper inlet of vertical motion cylinder 88 is opened to high pressure air through air line 90 as activated by controls (not shown), thereby moving the vacuum head from the upraised position toward a lowered position. As illustrated in FIGS. 11 and 11A, exact positioning of the vacuum head 11 over the trimming die's frame 128 is achieved by interengagement of the centering pins 28 fixed to the die frame with centering lugs 29 fixed to the vacuum head. This interengagement causes the trimming die's frame 128 to move slightly on bolt supports 136 (if necessary) until the holes 129, 130 in the trimming die are exactly centered relative to the vacuum head's inverted pans 22, 23 which hold the waffles.

As the vacuum head 11 is lowered toward engagement with the die frame 128, and as pans 22, 23 are passed through holes 129, 130 in that die frame, any charred or overcooked batter portion extending beyond a regular geometrical definition of each waffle group's periphery 153 (FIG. 10) is trimmed therefrom by the shape edges of the trimming die's holes. At that point the vacuum in the vacuum head's vacuum chamber 59 is released opening vacuum release valve 67 as activated by controls, not shown, thereby permitting the waffle groups 24 to drop through the die frame 128 onto the transfer conveyor 13. As the waffles drop through the die frame 128, retarder lips 30 at the trailing or upstream end 152 of each hole 129, 130 in the trimming die prevent that trailing or upstream end of each waffle group 24 from dropping out of the die frame until the forward or downstream end of each waffle group has engaged the transfer conveyor as particularly illustrated in FIG. 11. Once such an attitude of waffle groups 24 has been achieved as shown in FIG. 11, the transfer conveyor 13 itself draws the waffles off the retarder lips 30, thereby permitting same to fall into flush or supported relation with the surface of the transfer conveyor 13. Thus, the retarder lips 30 function to insure that the leading edge (relation to the machine direction 9 of the transfer conveyor 13) of each waffle group 24 always is the first edge to contact with the transfer conveyor. This insures that the trailing edge of a waffle group 24 would not engage the transfer conveyor before the leading edge; if such occurred, the waffle group could be crushed beneath the die frame 128, thereby, rendered commercially unsaleable.

After the waffle groups 24 have been pushed through the die frame 128, high presure air from air line 90 is introduced into the lower inlet of the vertical motion cylinder 88 and the upper inlet is vented, thereby raising the vacuum head 11 once again into the full up or phantom line position shown in FIG. 1. Thus, a single operational cycle of the vacuum head 11 is completed.

Having described my invention in detail, what I desire to claim and protect by Letters Patent is:

1. A waffle transfer machine particularly adapted to transfer baked waffles from a waffle iron conveyor to a transfer conveyor, said machine including
   a vacuum head structured to pick waffles by vacuum off successive waffle irons carried by said waffle iron conveyor, said vacuum head being connected to a vacuum source,
   a carriage structure to which said vacuum head is fixed, said carriage structure being adapted to move said vacuum head in a vertical direction over said waffle iron conveyor for picking up waffles off said waffle irons, in a vertical direction over said transfer conveyor for discharging said waffles onto said transfer conveyor, and said carriage structure also being adapted to move said vacuum head in a horizontal direction for reciprocating said vacuum head between a first position over said waffle iron conveyor and a second position over said transfer conveyor, and
   a trimming die positioned over said transfer conveyor, said waffles being passed through said trimming die for trimming same into a regular defined geometry upon discharge from said vacuum head onto said transfer conveyor.

2. A waffle transfer machine as set forth in claim 1, said carriage structure including
   an upper carriage adapted to reciprocate said vacuum head between said first and second positions, and
   a lower carriage adapted to move said vacuum head in a path parallel to said waffle iron conveyor, thereby permitting said vacuum head to pick up waffles from successive waffle irons without stopping said waffle iron conveyor.

3. A waffle transfer machine as set forth in claim 2 including
   upstream motion means connected with said lower carriage, said upstream motion means being adapted to move said vacuum head upstream of a centered position prior to said vacuum head being lowered fully into pick-up relation with said baked waffles,
   an activator arm fixed to said vacuum head, and
   a series of activator lugs fixed to said waffle iron conveyor, said activator arm and one of said activator lugs coacting with one another into a fixed mechanical connection so as to center said vacuum head over said waffle iron conveyor when said vacuum head is lowered into pick-up relation with said baked waffles.

4. A waffle transfer machine as set forth in claim 3, said actuator arm and actuator lugs also coacting with one another so as to draw said vacuum head in the machine direction of said waffle iron conveyor against the bias of said upstream motion means as said vacuum head makes the pickup of said waffles from said waffle irons.

5. A waffle transfer machine as set forth in claim 4 including
centering motion means connected with said lower carriage, said motion means being adpated to return said vacuum head to said centered position after pickup of said waffles prior to said vacuum head being moved from said first position to said second position.

6. A waffle transfer machine as set forth in claim 1 including
a retarder lip fixed at the upstream edge of said trimming die, said retarder lip coacting with each waffle to insure that said waffle's downstream edge contacts said transfer conveyor prior to said waffle's upstream edge after said waffle passes through said trimming die.

7. A waffle transfer machine as set forth in claim 1 including
centering means partially carried on said vacuum head and partially carried on said trimming die, said centering means permitting said vacuum head to be exactly centered relative to said trimming die during passage of said waffles through said trimming die.

8. A waffle transfer machine as set forth in claim 1 including
a floating mount for said trimming die, said floating mount permitting said vacuum head and trimming die to be centered relative one to the other during passage of said waffles through said trimming die.

9. A waffle transfer machine as set forth in claim 8 wherein said floating mount includes
at least three point supports on which said trimming die is supported relative to ground level, and
motion limit structure adapted to permit limited horizontal motion of said trimming die on said point supports.

10. A waffle transfer machine as set forth in claim 1, said vacuum head including
a substantially planar plate having a series of holes therein, said holes being arranged in a mixture relation one with the other analogous to the ribbed geometry of a baked waffle, said holes thereby overlying said waffle's ribs when said vacuum head is lowered into vacuum pick-up relation therewith.

11. A waffle transfer machine as set forth in claim 10, said vacuum head being sized to pass into said trimming die, the excess baked waffle extending beyond the periphery of said vacuum head being trimmed off as said vacuum head is passed into said trimming die.

* * * * *

UNITED STATES PATENT AND TRADEMARK OFFICE
CERTIFICATE OF CORRECTION

PATENT NO. : 4,058,039
DATED : November 15, 1977
INVENTOR(S) : Richard R. Schmid It is certified that error appears in the above-identified patent and that said Letters Patent are hereby corrected as shown below:

Column 9, line 51, after "thereof," insert -- by --

Column 10, line 1, "pin" should be -- pins --

Column 10, line 5, "pin" should be -- pins --

Column 12, line 1, "machanical" should be -- mechanical --

Column 13, line 23, "simple" should be -- simply --

Column 13, line 53, "shape" should be -- sharp --

Column 14, line 3, "relation" should be -- relative --

UNITED STATES PATENT AND TRADEMARK OFFICE
CERTIFICATE OF CORRECTION

PATENT NO. : 4,058,039
DATED : November 15, 1977
INVENTOR(S) : Richard R. Schmid It is certified that error appears in the above-identified patent and that said Letters Patent are hereby corrected as shown below:

Column 14, line 9, after 128, insert -- and --

Column 14, line 12, "pressure" should be -- pressure --

Column 15, line 11, "adpated" should be -- adapted --

Column 16, line 19, "mixture" should be -- matrix --

Signed and Sealed this

Ninth Day of May 1978

[SEAL]

Attest:

RUTH C. MASON
Attesting Officer

LUTRELLE F. PARKER
Acting Commissioner of Patents and Trademarks